Aug. 21, 1973   F. O. BELZER ET AL   3,753,865
METHOD AND APPARATUS FOR PRESERVING HUMAN ORGANS EXTRACORPOREALLY
Original Filed April 21, 1969                4 Sheets-Sheet 1
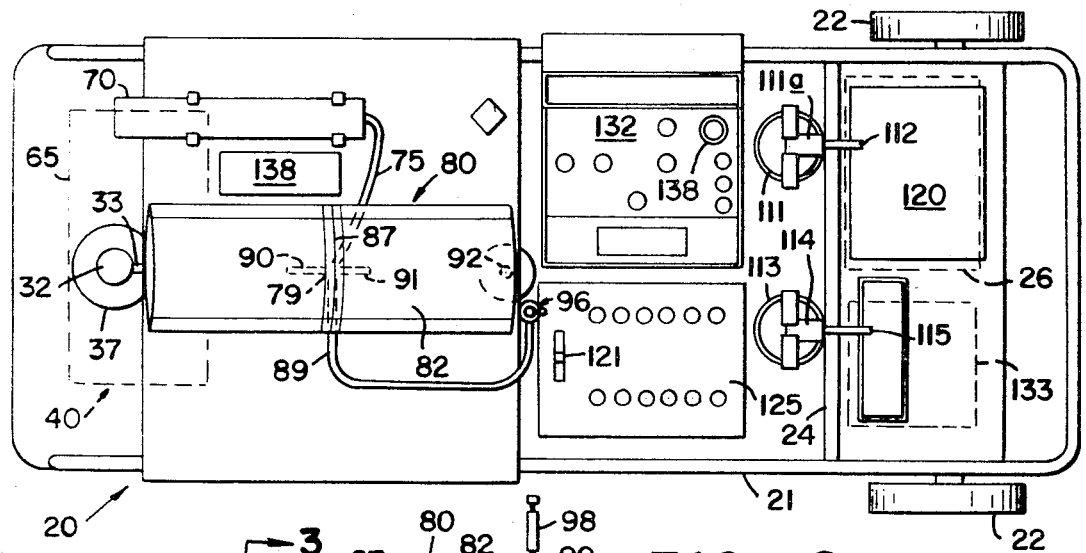
FIG_2
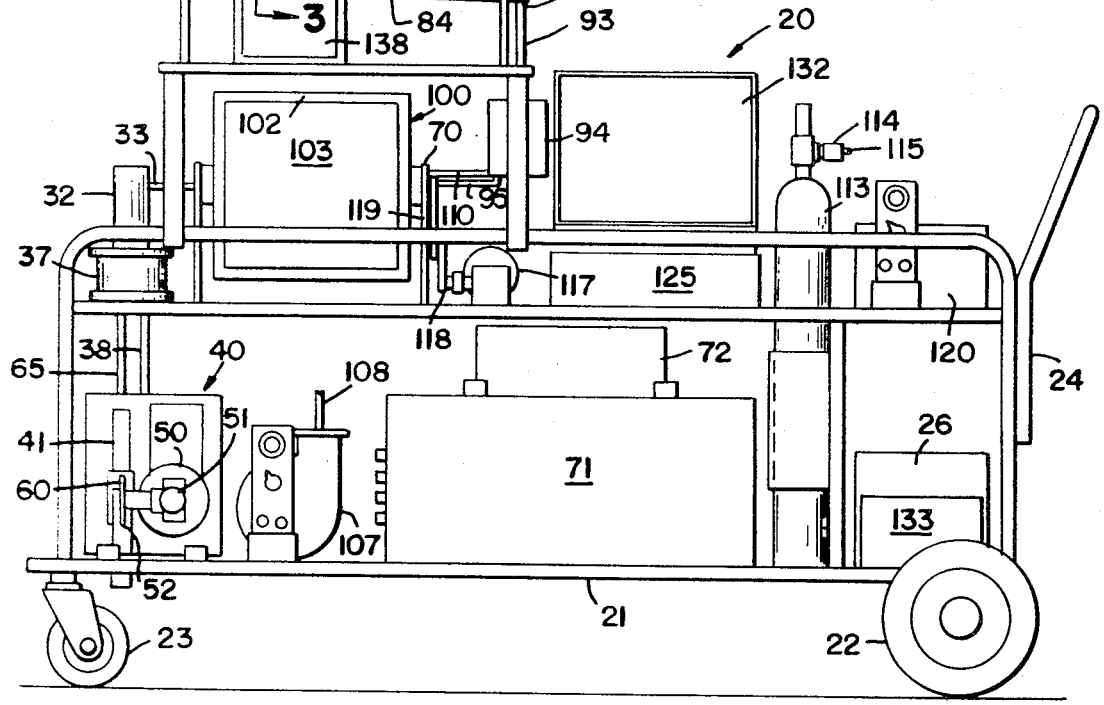
FIG_1
INVENTORS
FOLKERT O. BELZER
BY CHESTER W. TRUMAN
Owen, Wickersham & Erickson
ATTORNEYS

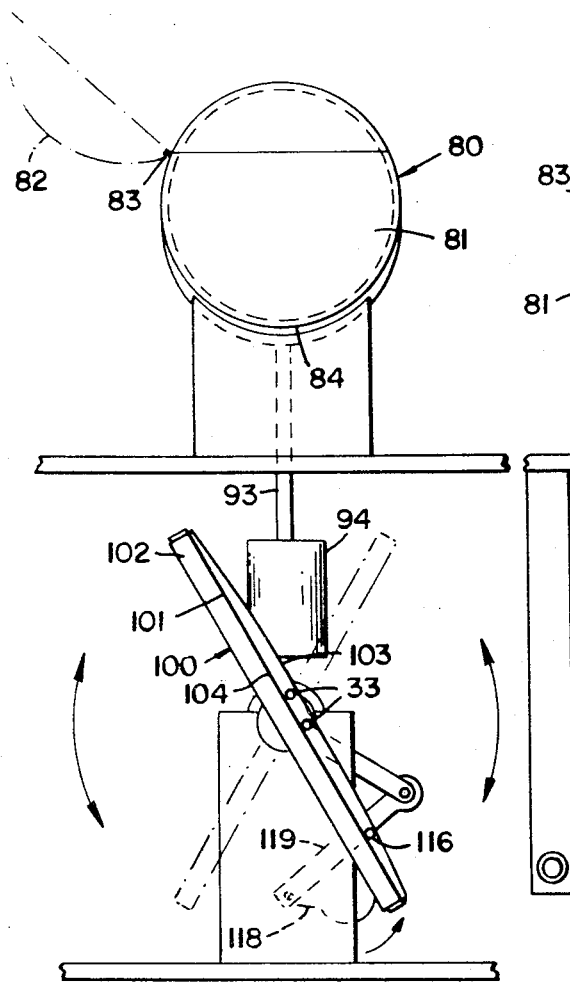
FIG_3
FIG_4
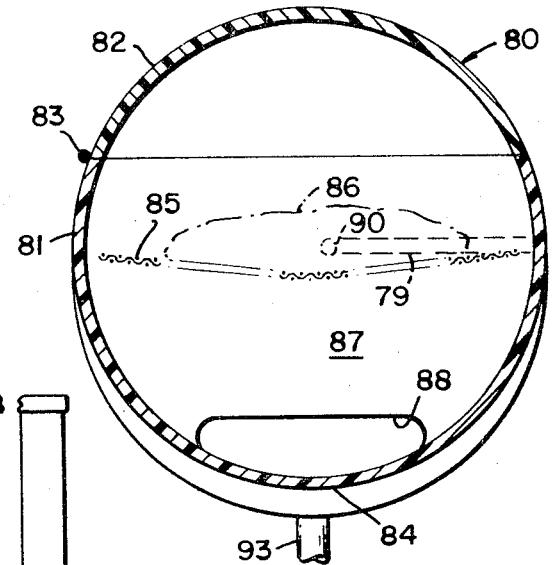
FIG_10
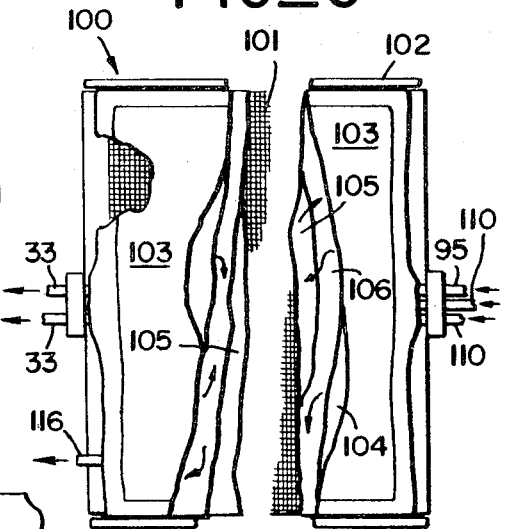
FIG_5
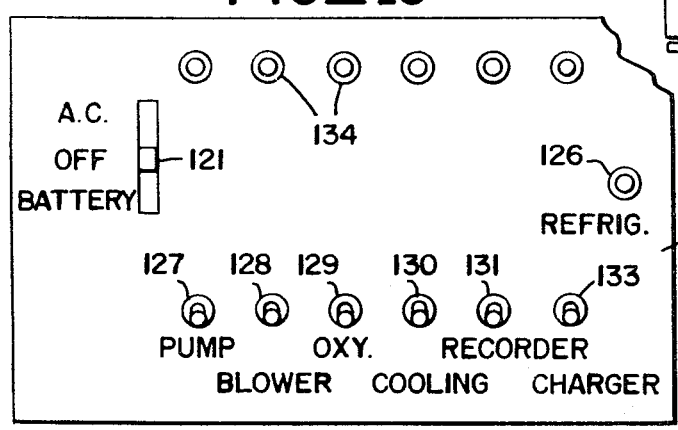
INVENTORS
FOLKERT O. BELZER
BY CHESTER W. TRUMAN
*Owen, Wickersham & Erickson*
ATTORNEYS

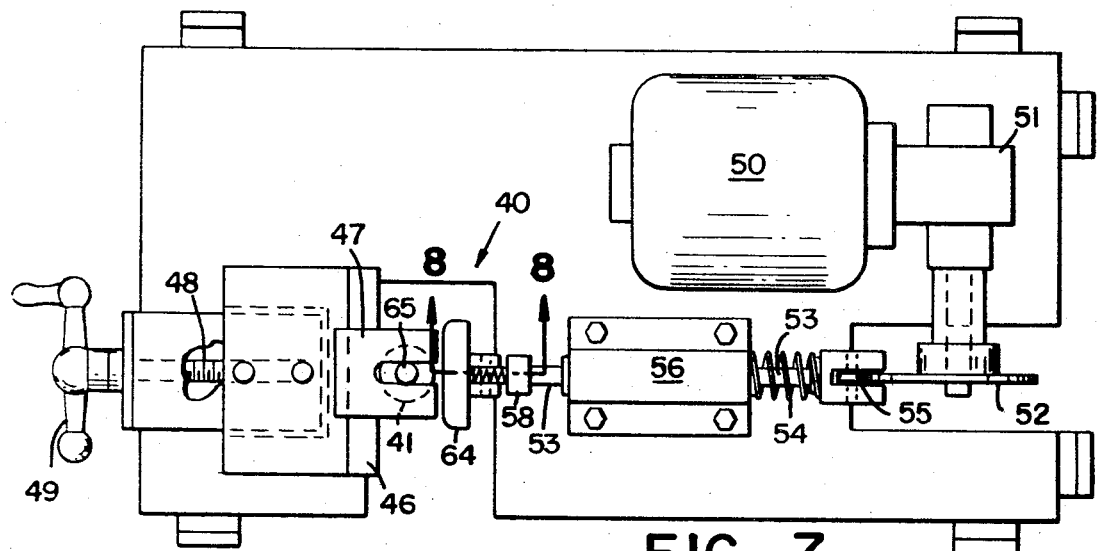
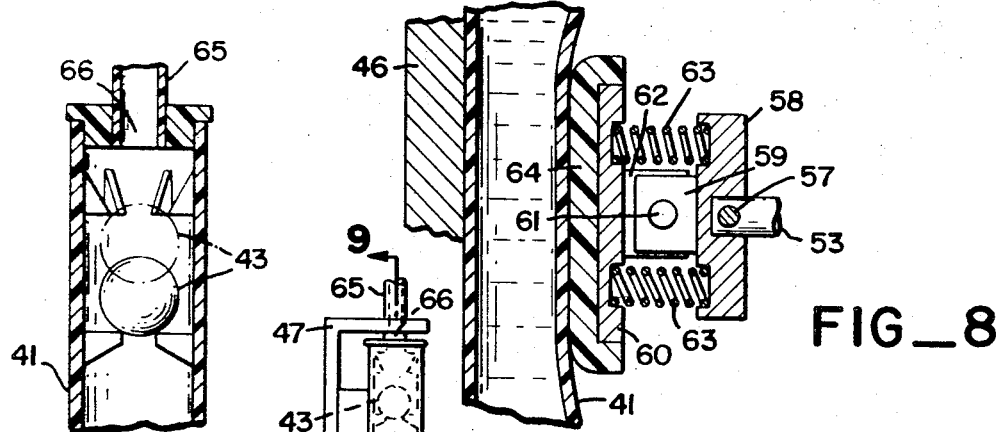
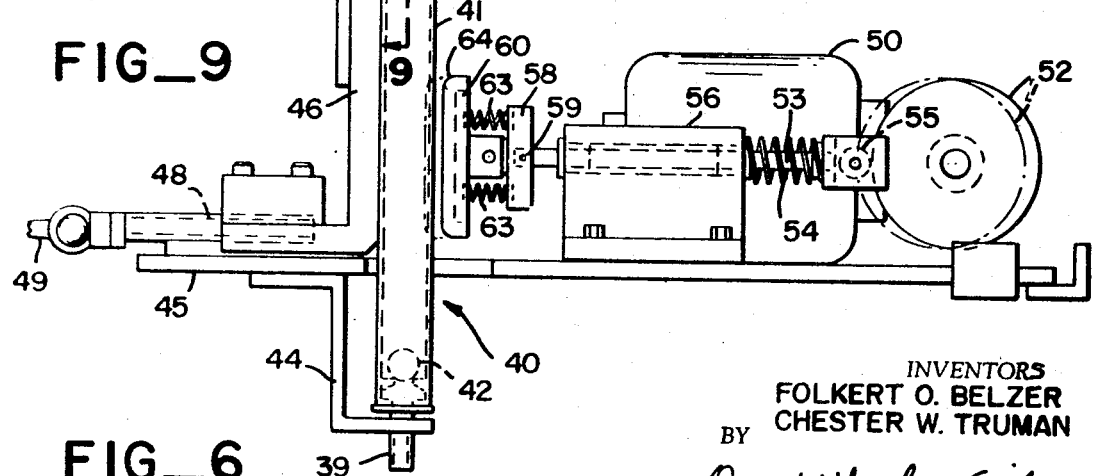

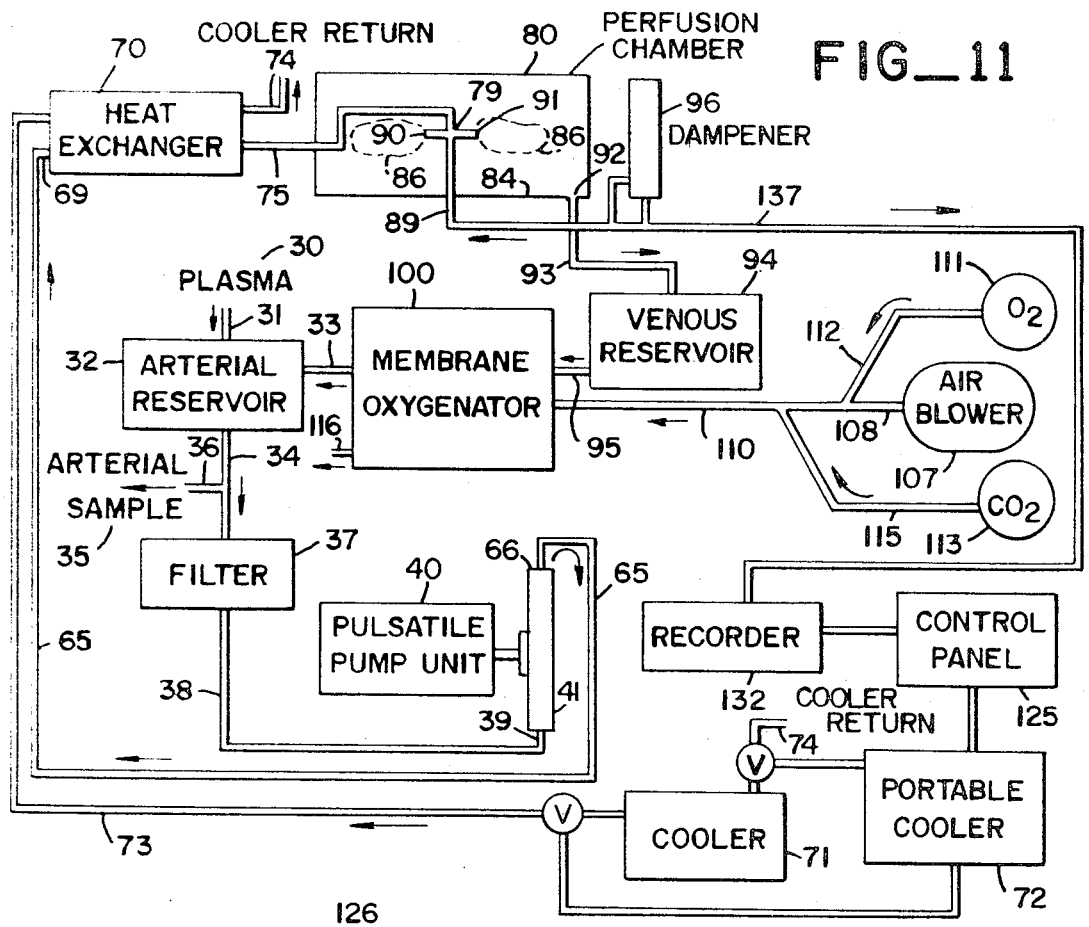
FIG_11
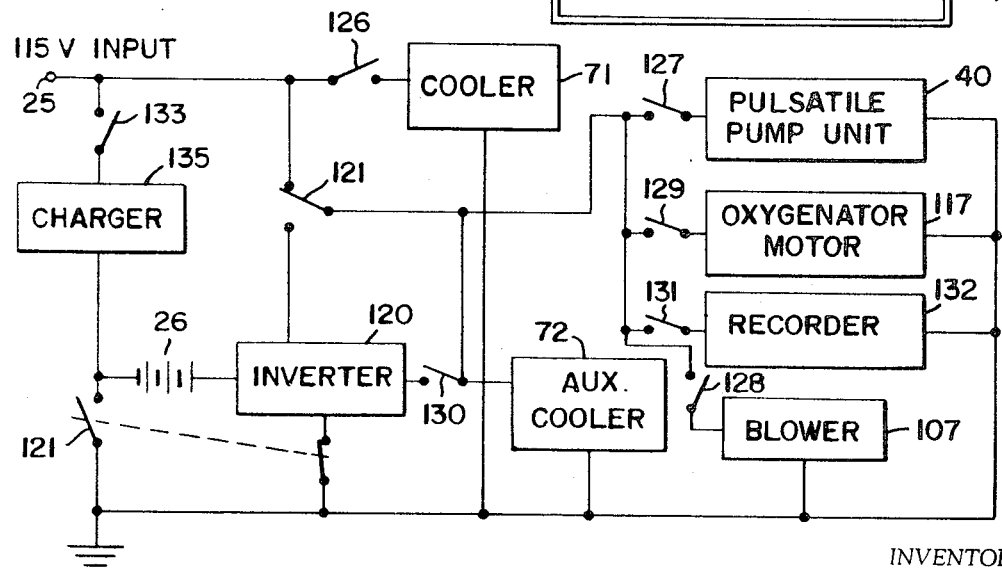
FIG_12

_United States Patent Office_

3,753,865
Patented Aug. 21, 1973

3,753,865
METHOD AND APPARATUS FOR PRESERVING HUMAN ORGANS EXTRACORPOREALLY
Folkert O. Belzer, Mill Valley, and Chester W. Truman, Daly City, Calif., assignors to The Regents of the University of California, Berkeley, Calif.
Application Apr. 21, 1969, Ser. No. 825,099, which is a continuation-in-part of abandoned application Ser. No. 727,762, May 9, 1968. Divided and this application Mar. 12, 1971, Ser. No. 123,750
Int. Cl. A61b *19/00;* A61m *1/03;* C12k *9/00*
U.S. Cl. 195—127                                                             16 Claims

ABSTRACT OF THE DISCLOSURE

A human organ is stored, between removal from one body and implantation in another, in an apparatus mounted on a wheeled cart. The apparatus has a pulsatile pump for pumping plasma, a heat exchanger connected to the outlet of the pump for cooling the plasma to about 4° to 8° C., and a perfusion chamber to which the cooled plasma is supplied. The perfusion chamber includes a support for the organ and means for connecting the organ to the pulsing flow of cold plasma. Venous effluent from the organ is collected and conducted by gravity to a membrane oxygenator, which returns oxygenated plasma to the pulsatile pump for recirculation through the organ.

---

This application is a division of application Ser. No. 825,099, filed Apr. 21, 1969, now U.S. Pat. No. 3,632,-473, which is a continuation-in-part of application Ser. No. 727,762, filed May 9, 1968, and now abandoned.

This invention relates to method and apparatus for preserving human organs outside the body.

The invention described herein was made in the performance of work under research grants from the U.S. Public Health Service.

Heretofore there have been many difficulties and inconveniences in the process of transplanting human organs from one person to another. For example, patients waiting to receive an unrelated donor kidney have had to be on constant standby in a hospital, sometimes for weeks. When the donor appeared, the timing was very important, for the surgery had to be substantially simultaneous so that immediately upon removal of the kidney from the donor, it could be put into the patient. This meant that there had to be at least two surgical teams working on the transplantation. The donor and the patient had to be located very close to each other during these operations, because there was no way of preserving the kidneys for any substantial period of time after they had been removed from the donor body and before they were put into the patient's body. The procedure was always therefore an emergency procedure and was fraught with risks as well as difficulties. Similar problems and the same difficulties have applied to the transplantation of other organs, such as a heart or liver.

The present invention solves these problems by making it possible to keep the organ alive for many hours up to several days after removal from the donor body. This makes it possible to use cadaver kidneys, hearts, and livers and to have the removal operation and the transplant operation spaced apart by several days. The transplantation, therefore, can be an elective rather than an emergency procedure.

Since additional time is available, it is possible to match the donor and recipient by tissue typing, for unrelated donors who are proved compatible by tissue typing are generally as successful as donors who are related to the recipient.

Also, with the new apparatus of this invention available, it is possible for the recipient to wait at home until the correctly matched kidney or kidneys are available. Similar procedure is possible for other organ transplantation.

This invention also enables a single team of surgeons to do the removal operation and the transplanting operation, and the surgery can be spaced apart by several days if necessary. Or the use of two teams is still possible, but they need not be close to each other at the time, for the organ can be moved substantial distances during the time when the organ is out of both bodies.

In the present invention the system incorporates transfer of the kidney, heart, liver or other organ from the donor's body into a perfusion chamber where human plasma, kept in constant supply and preferably fortified with hormones and other substances, is pumped through the organ. The organ functions generally as it would in the body; for example, kidneys in the perfusion chamber produces urine; however, it is important in the invention to perform the perfusion at low temperatures, so that the organ's activity is kept at a minimum. The plasma is recirculated and oxygenated, and its pH is adjusted as by a supply of carbon dioxide. Careful filtering enables the plasma to be kept free from foreign matter. The pumping of the plasma through the organ is done by a pulsatile pump, so that pulses similar to those produced by the human heart are employed to force the cold plasma through the organ. Pressure is controlled with the aid of a damper having an air spring. The operation of the apparatus thus resembles the operation in the human body but differs from it in being conducted at a very low temperature and in the type of control involved. Also, in a kidney, for example, it is not necessary to free the recirculated plasma from the small amount of urine produced during storage, for the freeing of the kidney from the urine can take place later in the patient's body after transplant. Pressures maintained on the organ are substantially those met by the organ in the human body, and the flow of plasma through the organ is controlled in accordance with the pressure desired.

Another significant feature of the method of this invention is its use, at least with kidneys, of cryoprecipitated filtered plasma.

Other objects and advantages of the invention, as well as other features, will appear from the following description of a preferred embodiment of the invention.

In the drawings:

FIG. 1 is a view in side elevation of an organ preservation apparatus embodying the principles of the invention.

This particular apparatus is used for preserving two human kidneys at once, and it is incorporated in a portable supporting cart. Some conduits and wires are omitted to avoid needless confusion.

FIG. 2 is a top plan view of the apparatus of FIG. 1.

FIG. 3 is an enlarged view in section, taken along the line 3—3 in FIG. 1, of the perfusion chamber in which two kidneys may be simultaneously maintained.

FIG. 4 is a fragmentary enlarged view in end elevation of a portion of the apparatus of FIG. 1. The oxygenator is shown in one of its positions in solid lines and in another of its positions in broken lines, while the perfusion chamber is shown above the oxygenator with its lid swung open.

FIG. 5 is a plan view of the oxygenator, broken in the middle to conserve space and with layers stripped away selectively to show the different layers and to illustrate the flow of air or oxygen therethrough.

FIG. 6 is a view in side elevation of the pulsatile pump apparatus embodying the principles of the invention, employing a micrometer for enabling delicate adjustment. The eccentric cam and reciprocating pump actuator are shown in one extreme position in solid lines and in another exteme position in broken lines.

FIG. 7 is a top plan view of the pulsatile pump apparatus of FIG. 6.

FIG. 8 is an enlarged fragmentary view in section taken along the line 8—8 in FIGS. 6 and 7, but showing the pump actuator in the position shown in broken lines in FIG. 6.

FIG. 9 is an enlarged fragmentary view in section taken along the line 9—9 in FIG. 6. The ball outlet valve is shown in its open position in solid lines, while broken lines show its closed position.

FIG. 10 is a view in front elevation of a control panel for the apparatus of FIG. 1, a portion being broken away to save space.

FIG. 11 is a flow diagram of the plasma, the coolant, and the oxygenating gases used in the system of FIG. 1.

FIG. 12 is an electrical circuit diagram of the apparatus of FIG. 1.

While applicable to various human organs, the invention will be illustrated by the following example of apparatus 20 for preserving human kidneys outside the bodies. Since an important feature of the invention is its ability to move the organ from one place to another, the preferred embodiment 20 shown in FIGS. 1 and 2 comprises a cart 21 having wheels 22 and caster wheels 23 supporting a frame 24, which may include several auxiliary supporting decks or other support facilities. The entire unit 20 may be mounted on this cart 21, and it is preferably provided with a double electrical system as shown in FIG. 12. One electrical system uses plug-in current, such as a 115-volt alternating current input 25 obtained from base plugs commonly found in hospitals; the other electrical system relies on a battery 26. The battery system is used while the cart 21 is moved from one location to another carrying a live organ and also, if and when it is necessary, for standby, as during power failures. Normally, in a fixed location the alternating current system is used.

The apparatus 20 is preferably put together very compactly, and the parts are so closely related that sometimes in the drawings they obscure each other; hence, many of the cords and tubes have been omitted from the drawings. It will be helpful during the following description for the reader to make frequent reference to the flow diagram of FIG. 11 and the electrical circuit diagram of FIG. 12.

As shown in FIG. 11, fresh human plasma 30 is added to an inlet 31 of an arterial reservoir 32, which has a recirculation inlet conduit 33 for recirculated plasma. As described later the plasma 30 is preferably cryoprecipitated and filtered plasma. The plasma 30 may include additives such as hormones, steroids, penicillin, magnesia, or insulin. An object conduit 34 from the arterial reservoir 32 enables withdrawal of arterial samples 35 from time to time through an outlet 36, and it conducts the plasma 30 to a filter 37 which delivers the plasma 30 in a state free from any foreign particles through a conduit 38 to the inlet 39 of a pulsatile pump 40. The filter 37 may use two layers of fine silk mesh.

The pulsatile pump 40 is a very important part of the apparatus and is shown especially well in FIGS. 6–9. It employs a flexible deformable tube 41, preferably of transparent plastic, which is used in many parts of this machine, because the plastic is a good heat insulator and also because it enables direct observation. The tube 41 has an inlet valve 42 at its inlet 39, preferably at the bottom end, and an outlet valve 43, preferably at its top end. The tube 41 is supported, preferably vertically, as by a lower bracket 44 secured beneath a deck 45, by a vertical anvil wall 46 that is supported on the deck 45, and by an upper bracket 47 secured to the anvil wall 46. The brackets 44 and 47 maintain closure of the upper and lower ends when pressure is exerted on the walls of the tube 41 and prevent movement of the tube ends. As will be seen, the anvil wall 46 is movable relative to the deck 45 by means of a micrometer screw 48 having a handle 49. The anvil wall 46 at all positions supports one side of the tube 41.

The pump is pulsed by a motor 50, which may be equipped with a right-angle drive 51 to rotate a cam 52 which is shaped so as to impart reciprocating motion to a shaft 53. The shaft 53 is provided with a return spring 54 and a cam follower 55 to enable it to reciprocate as the cam 52 is rotated, and it extends through a guide 56 to an outer end 57, where it supports a bar 58. The bar 58 has a projection or link 59 that pivotally supports a plate 60 by a pin 61 and link 62, and a pair of springs 63 provide a yielding cushion between the plate 60 and the bar 58. The plate 60 comprises the pump actuator and preferably has a plastic face 64, and reciprocation of the shaft 53 results in reciprocation of the plate 60. The plate or actuator 60 is so located that it is able to bear against the side wall of the tube 41 opposite the anvil wall 46.

The tube 41 may be positioned relative to the actuator 60 by movement of the micrometer 48, which is very similar to those used on a lathe, to give a very delicate adjustment of the position of the tube 41. If the handle 49 is turned so that the anvil wall 46 is sufficiently distant from the plate 60, then the plate 60 cannot come into contact with the tube 41 at all and there is no pumping. If the micrometer handle 49 is then turned slowly, it is possible to adjust very accurately the maximum pressure exerted by the plate 60 on the flexible wall of the tube 41. Outward movement of the plate 60 in each cycle then presses in one side of the tube wall, opposite the anvil 46, and exerts pressure which sends a charge of plasma 30 out through the upper valve 43; similarly, withdrawal of the plate 60 in each cycle then results not only in closure of the outlet valve 43, which acts then as a check valve, but also in drawing in a charge plasma 30 through the inlet valve 42. During each cycle, the outward movement of the plate or actuator 60 acts through the liquid in the tube 41 to force the inlet valve 42 down to its closed position, so that it then acts as a check valve, while opening the valve 43 and exhausting a charge dependent in volume on the relative position of the plate 60 and tube 41. The stroke of the plate 60 remains constant unless the cam 52 is changed, and the springs 63 help to give some resiliency. Thus, by the micrometer 48 and the position of the anvil wall 46, the pulsatile pump 40 of this invention gives very fine control of the pumping pressure of the plasma 30, in conjunction with a damper 96. The speed of the motor 50 determines the pulse rate, as it too is adjustable. Thus, volume of plasma pumped and the pulse rate are determined by the pump 40, and plasma pressure is, in part, controlled by it.

A conduit 65 leads from an outlet 66 above the valve 43 to the inlet 69 of a heat exchanger 70. As stated before, it is quite important in this invention that the perfusion be conducted at very cold temperatures, about as near to freezing as one can get without actually freezing the plasma at any point of the cycle. This will usually mean cooling the plasma 30 to about four to eight degrees C. To get the plasma much colder might result in its freezing in the heat exchanger 70. The heat exchanger 70 may be of any desired type, but should be suitable for use with a pulsing system without affecting the pressure of the plasma when the coolant changes pressure. By way of example, cold alcohol or cold water may be forced through a central conduit around which is a conduit carrying the plasma. Preferably, two coolers are used in conjunction with the heat exchanger 70. A main cooler 71 employs an electrical refrigerating unit to circulate cold alcohol to the heat exchanger 70; this cooler 71 is used during stationary operation and only with the plug-in circuit. A portable cooler 72, comprising a simple chamber of ice water and a small circulating pump, is used principally during transportation and at other times when the operation is on battery power, but is made to be operable also by plug-in current in emergencies, as if the cooler 71 should fail to operate properly. Both coolers 71 and 72 send their cold liquid through a tube 73 to the heat exchanger 70, from which it is returned through a tube 74. From the heat exchanger 70, the cooled plasma passes by a conduit 75 to a T 79 in a profusion chamber 80.

The perfusion chamber 80 may be generally cylindrical, having a stationary lower housing portion 81 and a lid-like upper housing member 82 held by a hinge 83 to the portion 81. The chamber 80 is normally filled with air at ambient pressure and temperature. As shown in FIG. 1, the perfusion chamber 80 is located on a slant so that the plasma effluent from the kidney or other organ flows downhill along a bottom wall 84. Approximately midway up the chamber is a support member 85, which may be a screen to enable full exposure otherwise, and on which a kidney 86 or other organ may be placed. Preferably, the perfusion chamber 80 is divided by a central wall 87 into two sections, each with its own screen 85 but with the bottom wall 84 continuing straight through from one section to the other, through an opening 88. This enables the handling of kidneys 86 in pairs, as that is the way they, of course, occur in the body. Into this central partition 87 is brought the pulsing flow of cold plasma by the T 79, and a pair of outlets 90 and 91 are provided, to each one of which is connected the proper portion of a kidney 86, which rests on its screen 85. No additional refrigeration of the organ 86 is needed.

Thus, the arterial portion of the plasma circulation cycle is completed as the cold plasma is pumped by the pulsatile pump 40 (which represents the arterial delivery part of the human heart), to the kidneys 86 via the heat exchanger 70. The effluent of venous plasma is collected on the bottom wall 84 and flows down to an outlet 92 at the lower end of the perfusion chamber 80, whence it is then carried by a conduit 93 into a venous reservoir 94. From there, the venous plasma passes by a pair of conduits 95 to a membrane oxygenator 100.

Pressure of the plasma supplied to the kidneys 86 may be regulated with the aid of a manifold-pulse dampener 96, which is connected to the T 79 by a conduit 89. A thick-walled transparent cylinder, the dampener 96 has a lower inlet 97 for plasma and a cushion of air is retained at the upper end of the cylinder, making an air spring. A connection 98 is secured to the upper end wall 99 and enables addition or subtraction of air from the dampener 96. Thus, if the pressure is too low, more air is added to the dampener cylinder 96 by the syringe, adding to the air pressure that must be opposed by the plasma in its delivery pulses, so that less of the pressure imposed by the pump 41 is taken up by the air cushion. If the pressure is too high, the air spring is made less forceful by letting some of the air out of the cylinder 96 through the connection 98. The dampener 96 thus cooperates with the pump 40, which also affects the pressure as its displacement is varied.

The oxygenator 100 preferably comprises a flat support screenlike member 101, which gives rigid support and is mounted in a frame 102, and a membranous member which provides two outer walls 103 and 104 and two inner walls 105 and 106. Between each outer wall 103 and 104 and its adjacent inner wall 105, 106 a thin layer of the venous plasma is introduced from the conduits 95, and in between the two inner walls 105 and 106 a current of air, either alone or admixed with oxygen or with carbon dioxide or with both, is introduced. The gaseous oxygen is thus separated from the venous plasma by an oxygen penetratable membrane. The air may be supplied by a blower 107, or by a bellows-type pump that provides low-pressure compressed air, through a conduit 108 to a common conduit 110. This blower 107 (or the bellows-type pump) is, as is shown in FIG. 11, operated by the electrical circuit and is of rather light horsepower so that a steady flow of air at low pressure is obtained whether the battery 26 or the 115-volt input 25 is being used. Oxygen may be supplied from a cylinder 111 through a regulator 111a and a conduit 112 to the common conduit 110. Carbon dioxide may be supplied from a cylinder 113, through a regulator 114 and a conduit 115 to a common conduit 110, the conduits 110 may be in pairs, and the oxygenator 100 may be exhausted by gas outlets 116. These gas outlets 116 serve to regulate the air or gas pressure in the oxygenator 100, by relieving the interior.

The frame 102 is rocked back and forth by a motor 117, eccentric 118, and linkage 119, in order to circulate air to both outer walls 103 and 104 of the membranes, while the mixture of gases is circulated to the inner membrane walls 105 and 106. The air for the walls 103 and 104 may be ordinary room air, or a housing may be placed around the oxygenator 100 and the atmosphere may then be specially mixed, if that is desired. The rocking back and forth of the oxygenator 100 corresponds to the action of the lungs in the human body, and by mixing the venous plasma with oxygen, the plasma is suitable for use again as arterial plasma. It will be noted that gravity is substituted for one of the heart chambers, rather than having a second pump, and the membrane oxygenator 100 supplies the arterial reservoir 32 through the conduits 33.

When the plasma 30 flows by gravity from the membrane oxygenator 100 to the arterial reservoir 32, the cycle starts again. The same plasma can be used indefinitely with some makeup plasma to replace what is withdrawn for samples. Since each kidney 86 functions very slowly, insofar as production of urine is concerned, due to the cold temperature, there is no need to do anything about the accumulation of urine over periods of several days, for the amount is small. If it should be deemed advisable to do this, the supply of plasma may be withdrawn from the oxygenator 100 or even from the venous reservoir 94 and discarded, and a fresh supply added in the meantime to the arterial supply reservoir 32.

As shown in FIG. 12, the battery 26 may be used in conjunction with an inverter 120 and is placed in the circuit by a switch 121, so that it operates the pulsatile pump motor 50, the blower 107, the oxygenator motor 117, and the portable cooler 72. On the other hand, when the 115-volt input is used, the switch 121 is thrown to the other side, the battery 26 is then not in use, and a charger 122 attached to the 115-volt input 25 is used to recharge the battery 26 while the same motors are used as before except for the portable cooler 72, which is replaced in this instance by the regular cooler 71. Similar results can be obtained by D-C operation, using the battery 26 without an inverter and rectifying the A-C to the input 25. As shown in FIG. 10, a control panel 125 carries the switch 121 as well as a set of other switches, so that each motor is separately turned on or off: namely, a refrigerator switch 126 for the cooler 71, a switch 127 for the motor 50, a switch 128 for the blower 107, a switch 129 for oxygen addition, a switch 130 for the cooler 72, a switch 131 for a recorder 132, and a switch 133 for the battery charger 135. Lights 134 indicate which elements are turned on.

The recorder 132 is used to record the various data and may be used for automatic or manual control of several factors. Thus, one important factor is the pressure of the plasma as supplied to the kidneys 86. In this purpose, a conduit 137 leads from the dampener 96 (and therefore via the dampener 96 from the input to the kidneys 86) to a pressure gauge 138 at the recorder 132 which records that pressure. The information is used to adjust the pressure shown by the gauge 138 to the normal body pressure, by using the syringe 98 to vary the amount of air in the air-spring or dampener 96. The plasma temperature may also be recorded by a thermometric device and watched to control the circulating pump of either cooler 71 or 72, or control is made automatic to keep the plasma temperature constant.

The oxygenator 100 is carefully controlled to give desired results. For example, upon its removal from a cadaver, the kidney ordinarily is suffering from lack of oxygen in the blood; therefore, the plasma may then give pure oxygen from the oxygen cylinder 111. After a few minutes of this, some air can be mixed in and the amount of oxygen reduced. The pH is observed by use of a pH meter (not shown) which is from time to time supplied with a sample 35 of arterial blood removed from the arterial sampler 36; this enables the operator in charge to see whether additional carbon dioxide should be added to reduce the pH or whether the carbon dioxide should be reduced to increase the pH level.

A unique feature of this method has been the high flow rate, without a rise in perfusion pressure and the absence of tissue edema.

The role of platelet and blood cell aggregates, if whole blood is used, was well established and led to the initial selection of plasma as the perfusate in kidney transplantation. If the plasma was diluted in a ratio of 1:3 of electrolyte solution, and the osmolarity was maintained between 300 and 340 milliosmoles, edema of the kidney was minimal and perfusion pressure rose only slightly over a 24-hour period of perfusion. However, on reimplantation of these organs, function was greatly impaired and none of the animals survived autotransplantation with immediate contralateral nephrectomy. When undiluted plasma was used in tests, there was a recurrence of the rising perfusion pressure, severe edema, and tissue destruction. This was ameliorated, but not eliminated, by the use of the pulsatile pump and the membrane oxygenator. Under these circumstances, conventional microscopic studies showed no evidence of thrombi. However, when frozen sections were taken of the perfused kidney, fat stains revealed multiple small emboli in the renal arterioles, and fat droplets in the tubules and intratubular cells.

It appeared that the rising perfusion pressure was due to blockage of the vessels by lipid components liberated into the perfusate by denaturation.

Therefore, the present invention preferably employs a filtered cryoprecipitated plasma, obtained, as described in a co-pending patent application, Ser. No. 727,762, filed May 9, 1968, by preliminary denaturation of the lipoproteins by freezing and quick thawing. This may be done by storing the plasma at minus 20° C. for 12 to 24 hours, followed by rapid thawing in water at 60 to 70° C. Particular care is preferably taken not to warm the plasma to a temperature higher than 38° C. With thawing, a flocculation appears in the plasma, which is then removed by serial filtration, for example, through micropore filters with pore diameters of 1.2, 0.45, and 0.22 m$\mu$.

The residue on the filter paper has been analyzed by thin layer chromatography and found to consist primarily of phospholipids, namely lecithin, sphingomyelin, and lysolecithin.

Before the last filtration through the 0.22 m$\mu$. micropore filter, the following substances may be added to the perfusate per liter of ACD collected plasma. Dextrose—50%, 5 ml.; insulin—80 units; hydrocortisone—100 mg.; penicillin—200,000 units; magnesium sulfate—8 meq.; and phenolsulfonphthalein—12 mg.

Perfusion of the kidney with this filtered plasma completely eliminates the rising perfusion pressure. Fat stains show that the previously seen lipid particles are completely eliminated. After 72 hours of perfusion, kidney function is proven by reimplantation with immediate contralateral nephrectomy. The kidneys appear normal, and urine production usually occurs within 5 minutes after release of the vascular clamps. Post-operatively, all animals produce copious amounts of urine. Blood urea nitrogen rise has been noted in all animals, especially in the 72-hour group, but all return to normal within 2 weeks in the 24-hour group and within 5 weeks in the 72-hour group.

Animals in both the 24 and 72-hour groups have been followed for periods beyond 6 months, and studies at that time reveal normal renal function and renal architecture with no evidence of hypertension. Human transplantation has also proved successful.

The perfusate for the human perfusions is identical to that used in the animal experiments, except that the plasma is obtained from the blood bank as frozen plasma, AB+. Filtration of the plasma and the addition of the previously mentioned substances may be done at the time of notification of a potential donor.

Nearly all of the lipid components in blood plasma are combined with proteins, and the soluble lipoproteins are responsible for the transport of lipids in blood. There are at least three major groups of lipoproteins present in the plasma of mammals. These are the high density lipoproteins, the low density lipoproteins, and the chylomicrons. Certain factors effect the stability of lipoproteins in plasma, mostly in the low density group. Lipoproteins are readily damaged by conditions that are usually hazardous to plasma proteins, such as extremes of pH, and, in some cases, ionic strength, heat, freezing, the presence of ethanol (except at low temperature), and exposure to interphases such as gas-water or air-water. All of these agents tends to disrupt the complex, consisting of an aggregate of mixed lipids stabilized and limited by a specific peptide chain. This leads to aggregation of the lipids into larger particles, which greatly increases the turbidity of the solution.

By deliberate preliminary denaturation of the lipoproteins and subsequent filtration through micropore filters, the lipid aggregates are removed, and a perfectly clear plasma solution is obtained. Studies have shown that about only 30–35% of the lipid components were removed, probably primarily the low-density lipoprotein group because the high-density lipoproteins have a higher proportion of peptide to lipid molecule linkage and thus have a greater stability to temperature variations. It had been shown earlier that the low density lipoproteins make up 40% of the total phospholipids in plasma. With preliminary denaturation and subsequent filtration, 75–90% of the phospholipids can be removed, primarily in the low density group, thus eliminating the problem of lipid aggregates. Even in 72-hour perfusions, no fat emboli could be found after this preliminary filtration. The gentleness of the perfusion and the presence of a membrane oxygenator appear to prevent further denaturation of the more stable residual lipoproteins.

Such additives to the perfusate as insulin, cortisone, etc., were chosen on an empirical basis, and further studies may be required to show their necessity. It has been suggested that calcium acts as a membrane stabilizer. Because of the use of citrate in the perfusate used here, no calcium is available to the tissues, and the substitution of magnesium might counteract the absence of calcium. In addition, elevations of serum magnesium appear to be characteristic of hibernation.

Penicillin was added because of its nontoxic properties and with good surgical aseptic technic, infection has never been a problem in the animal or human preservation experiments. Steroids were added because of their theoretical advantage as tissue stabilizer. Dextrose was used on the basis of work reported by Folkman et al., although even after 72 hours of perfusion we have been unable to show a definite utilization of glucose. Probably the organ is at such a low temperature that glucose is barely used. The elimination of glucose, or perhaps the substitution of fructose, is presently under investigation. Phenosulfonphthalein is used as a pH indicator, and is of value as a rough estimate of pH during perfusion.

To those skilled in the art to which this invention relates, many changes in construction and widely differing embodiments and applications of the invention will sug-

We claim:

1. Apparatus for the preservation of a human organ during the time between removal from a donor body and implantation into a patient's body, comprising
   chamber means for supporting an organ,
   plasma supplying and cooling means for supplying cold plasma in a series of regular pulses to said chamber means and into said organ for perfusion thereof,
   collection means for collecting from said chamber means the effluent from the organ that results from the supply of plasma to the organ,
   membrane oxygenation means connected to said collection means for oxygenation of said effluent,
   filter means connected to said membrane oxygenation means for filtering the oxygenated plasma after oxygenation,
   recirculation means connected to said filter means for recirculating the filtered plasma to said plasma supplying and cooling means, and
   pressure regulating means connected to said chamber means for maintaining the pressure of the pulses of cold plasma at approximately that at which the organ is operated within the human body.

2. The apparatus of claim 1 wherein said cooling means is adapted for cooling the plasma to about 4° C.

3. Apparatus for storing a human organ between the operation of removal from one human body and implantation into another human body, comprising
   pulsatile means for pumping a flow of plasma in a pulsing manner,
   plasma cooling means connected to said pulsatile means for cooling the plasma after pumping to approximately 4° C.,
   perfusion means connected to said plasma cooling means for delivering the cool plasma in a pulsing manner to the intake of the organ,
   collecting means connected to said perfusion means for collecting the effluent from the organ,
   oxygenation means connected to said collecting means, for oxygenating the collected effluent and comprising means for interposing an oxygen penetrable membrane between gaseous oxygen and the said collected effluent, and
   recirculation means connected to said oxygenation means for recirculating the oxygenated effluent to said pulsatile means.

4. The apparatus of claim 3 having filter means for removing foreign particles from the effluent, between said oxygenation means and said recirculation means.

5. The apparatus of claim 3 having means for adding controlled amounts of carbon dioxide to the plasma at the oxygenation step in order to control the pH of the plasma at about the pH level of normal human blood.

6. The apparatus of claim 3 having means for regulating the pressure at which the plasma is supplied to the organ at substantially the pressure at which blood is supplied to that organ in a human body.

7. The apparatus of claim 6 wherein said means for regulating comprises an air spring connected to said perfusion means, and means for regulating the amount of air in said air spring.

8. Apparatus for the use of storing a human organ between removal from one body and implantation in another, comprising
   a portable cart carrying the entire apparatus,
   a pulsatile pump for plasma,
   means to supply plasma to the inlet of said pump,
   a heat exchanger connected to the outlet of said pump for cooling said plasma,
   cooling means connected to said heat exchanger for supplying a cooling fluid to said heat exchanger,
   means for supplying the plasma from the cooling means as a cooled pulsing flow,
   a perfusion chamber to which the plasma is supplied, having means for retaining the organ and means for connecting it to the pulsing flow of plasma,
   means in said perfusion chamber for collecting the venous effluent from the organ,
   means for conducting the effluent away therefrom,
   means for membrane oxygenation of the venous effluent and for returning it to the pulsatile pump.

9. The apparatus of claim 8 having filter means for removing foreign particles from the oxygenated venous effluent.

10. The apparatus of claim 8 having on said cart a battery and means for powering from said battery said pump, said cooling means, the circulation of cooling fluid between said cooling means, said heat exchanger, and said oxygenator, for use when said cart is moving, and also alternative means for powering said pump, said cooling means and supply of its cooled fluid to said heat exchanger, and said oxygenator from a supply of a-c power, for use during times when said cart is stationary.

11. The apparatus of claim 10 having means for supplying air to said oxygenator, selectively operable by either said battery or said alternative powering means.

12. The apparatus of claim 8 wherein said pulsatile pump comprises a flexible-walled tube, an anvil supporting one side thereof, an actuator bearing on the opposite side to force in the wall thereof, and means for reciprocating said actuator.

13. The apparatus of claim 12 having micrometer means for movably adjusting the position of said anvil and tube relative to said actuator.

14. The apparatus of claim 8 having means for varying the pressure at which said pump supplies the plasma to said organ.

15. The apparatus of claim 14 wherein said means for varying the pressure comprises a closed chamber containing a charge of air to act as an air spring, said closed chamber being connected to said means for connecting the organ to the pulsing flow of liquid.

16. The apparatus of claim 15 having air-injection means at the upper end of said closed chamber for adding additional air to said closed chamber and for taking air away from said closed chamber.

References Cited
UNITED STATES PATENTS

| | | | |
|---|---|---|---|
| 2,720,879 | 10/1955 | Gasca et al. | 23—258.5 |
| 3,212,499 | 10/1965 | Koreski | 23—258.5 |
| 3,332,746 | 7/1967 | Claff et al. | 23—258.5 |
| 3,406,531 | 10/1968 | Swenson et al. | 195—127 X |
| 3,545,221 | 12/1970 | Swenson et al. | 195—127 X |

OTHER REFERENCES

Eiseman et al., "A Disposable Liver Perfusion Chamber," Surgery, December 1966, vol. 60, No. 6, pp. 1183–1186.

Long, "A Pulsating Perfusion Apparatus," J. of Lab. & Clinical Med., vol. 32, 1947, pp. 300–310.

Long et al., "A Small Perfusion Apparatus for the Study of Surviving, Isolated Organs," J. of Lab. & Clin. Med., vol. 44, No. 4, October 1964, pp. 614–626.

BARRY S. RICHMAN, Primary Examiner

U.S. Cl. X.R.

23—258.5; 128—1 R

UNITED STATES PATENT OFFICE
CERTIFICATE OF CORRECTION

Patent No. 3,753,865            Dated   August 21, 1973

Inventor(s)  Folkert O. Belzer and Chester W. Truman

It is certified that error appears in the above-identified patent and that said Letters Patent are hereby corrected as shown below:

Column 7, lines 44-46, delete the phrase "as described in a co-pending patent application, Ser. No. 727,762, filed May 9, 1968,"

Signed and sealed this 10th day of December 1974.

(SEAL)
Attest:

McCOY M. GIBSON JR.
Attesting Officer

C. MARSHALL DANN
Commissioner of Patents